United States Patent
Honda et al.

(10) Patent No.: US 9,896,365 B2
(45) Date of Patent: Feb. 20, 2018

(54) SEAWATER DESALINATION SYSTEM AND SEAWATER DESALINATION METHOD

(71) Applicant: Hitachi Zosen Corporation, Osaka (JP)

(72) Inventors: Shizuo Honda, Osaka (JP); Hideyuki Niizato, Osaka (JP); Noriko Kira, Osaka (JP); Junichi Tsumura, Osaka (JP)

(73) Assignee: HITACHI ZOSEN CORPORATION (JP)

( * ) Notice: Subject to any disclaimer, the term of this patent is extended or adjusted under 35 U.S.C. 154(b) by 186 days.

(21) Appl. No.: 14/909,571

(22) PCT Filed: Jul. 25, 2014

(86) PCT No.: PCT/JP2014/003944
§ 371 (c)(1),
(2) Date: Feb. 2, 2016

(87) PCT Pub. No.: WO2015/025473
PCT Pub. Date: Feb. 26, 2015

(65) Prior Publication Data
US 2016/0176740 A1     Jun. 23, 2016

(30) Foreign Application Priority Data

Aug. 23, 2013 (JP) .................................. 2013-172889

(51) Int. Cl.
*C02F 9/00* (2006.01)
*B01D 61/02* (2006.01)
(Continued)

(52) U.S. Cl.
CPC .............. *C02F 9/00* (2013.01); *B01D 61/025* (2013.01); *B01D 61/04* (2013.01); *B01D 61/12* (2013.01);
(Continued)

(58) Field of Classification Search
None
See application file for complete search history.

(56) References Cited

U.S. PATENT DOCUMENTS

| 2014/0224746 A1 | 8/2014 | Niizato et al. ............. 210/747.5 |
| 2014/0238924 A1 | 8/2014 | Niizato et al. ............. 210/273 |

FOREIGN PATENT DOCUMENTS

| JP | 02-099191 A | 4/1990 |
| JP | 03-275197 A | 12/1991 |

(Continued)

OTHER PUBLICATIONS

International Search Report dated Sep. 3, 2014 in corresponding PCT International Application No. PCT/JP2014/003944.

(Continued)

*Primary Examiner* — Chester T Barry
(74) *Attorney, Agent, or Firm* — Ostrolenk Faber LLP

(57) ABSTRACT

A seawater desalination system includes an intake part buried in a sand layer of the seafloor to take in seawater passed through the sand layer, an anterior filtration part filtering seawater conveyed from the intake part, and a posterior filtration part filtering seawater conveyed from the anterior filtration part, using a reverse osmosis membrane. The anterior filtration part includes a first anterior filtration line including a first ultrafiltration membrane, a second anterior filtration line including a second ultrafiltration membrane having a molecular weight cut-off less than that of the first ultrafiltration membrane, and a switching part switching a path through which seawater flows between the first and second anterior filtration lines provided in parallel with each other. The system controls the switching part in accordance with dissolved oxygen content in the seawater taken in by the intake part, thereby improving the efficiency of seawater filtration with the ultrafiltration membranes.

14 Claims, 3 Drawing Sheets

(51) Int. Cl.
- *B01D 61/04* (2006.01)
- *B01D 61/12* (2006.01)
- *B01D 61/14* (2006.01)
- *B01D 61/58* (2006.01)
- *B01D 61/22* (2006.01)
- *C02F 1/00* (2006.01)
- *C02F 1/44* (2006.01)
- *C02F 103/08* (2006.01)

(52) U.S. Cl.
CPC ......... *B01D 61/142* (2013.01); *B01D 61/145* (2013.01); *B01D 61/22* (2013.01); *B01D 61/58* (2013.01); *C02F 1/008* (2013.01); *B01D 2311/04* (2013.01); *B01D 2311/2649* (2013.01); *B01D 2317/025* (2013.01); *C02F 1/001* (2013.01); *C02F 1/004* (2013.01); *C02F 1/441* (2013.01); *C02F 1/444* (2013.01); *C02F 2103/08* (2013.01); *C02F 2307/00* (2013.01)

(56) References Cited

FOREIGN PATENT DOCUMENTS

| | | |
|---|---|---|
| JP | 09-234353 A | 9/1997 |
| JP | 2003-245666 | 9/2003 |
| JP | 2012-246711 | 12/2012 |
| JP | 2013-075268 | 4/2013 |
| JP | 2013-086058 | 5/2013 |
| WO | WO 2005/092799 A1 | 10/2005 |
| WO | WO 2006/057249 A1 | 6/2006 |
| WO | WO 2008/096585 A1 | 8/2008 |
| WO | WO-2008096585 A1 * | 8/2008 ........... B01D 61/022 |

OTHER PUBLICATIONS

Written Opinion dated Sep. 3, 2014 in corresponding PCT International Application No. PCT/JP2014/003944.

A. Teuler et al., "Assessment of UF pretreatment prior RO membranes for seawater desalination," Desalination, vol. 125, No. 1-3, pp. 89-96, Nov. 1, 1999.

N.K.H. Strohwald et al., "An Investigation Into UF Systems in the Pretreatment of Seawater for RO Desalination," Water Science & Technology, vol. 25, No. 10, pp. 69-78, Jan. 1, 1992.

* cited by examiner

[Fig. 1]
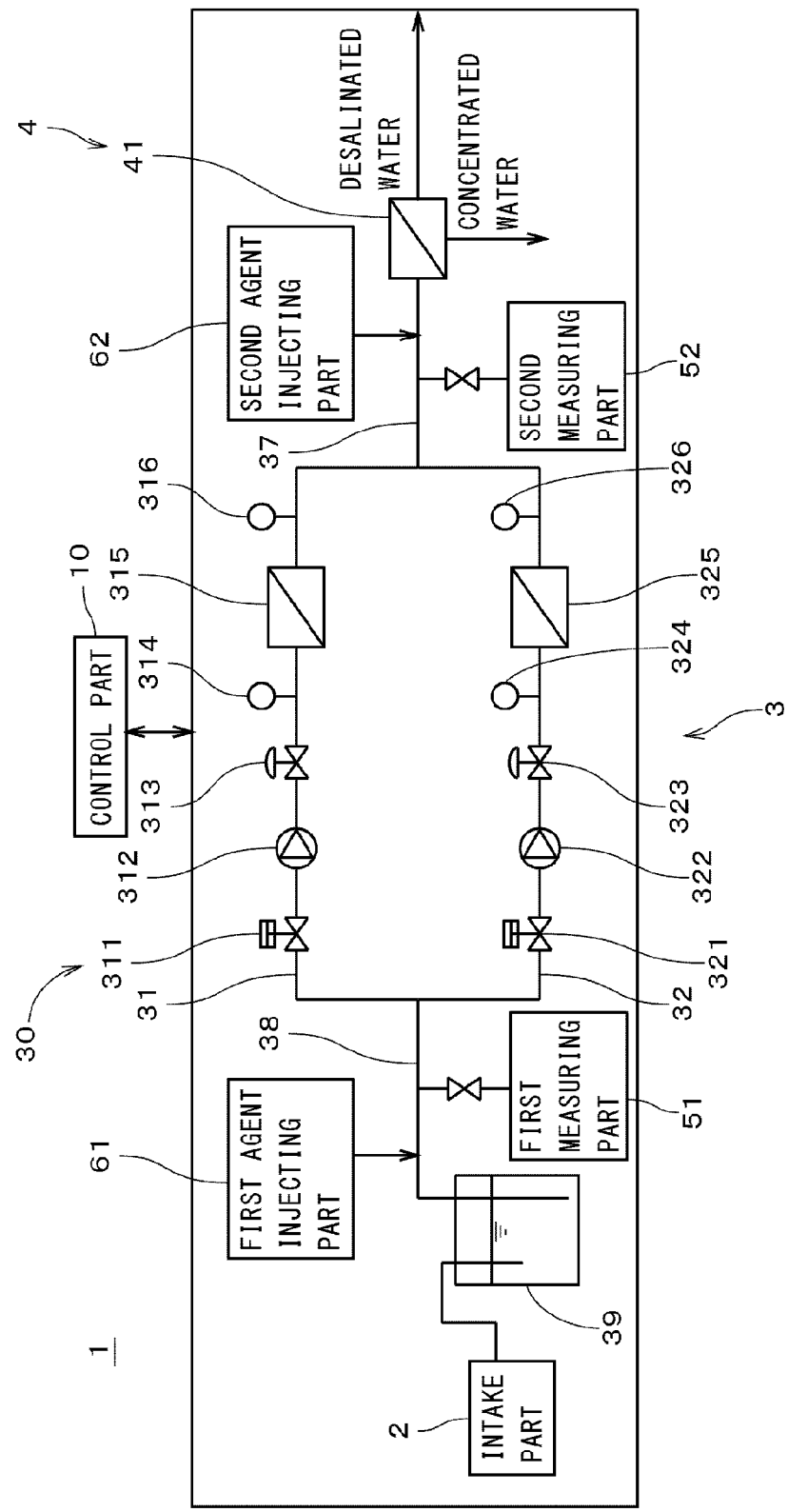

[Fig. 2]
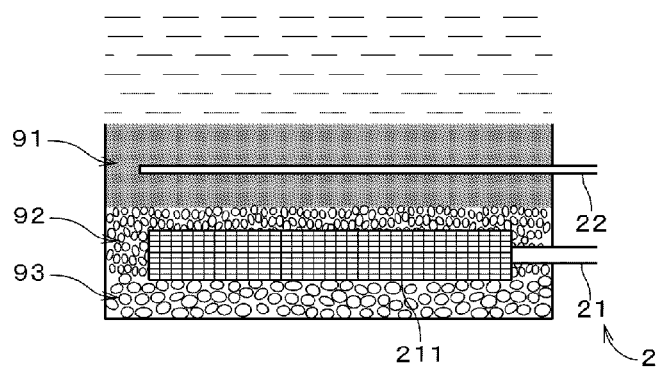
[Fig. 3]
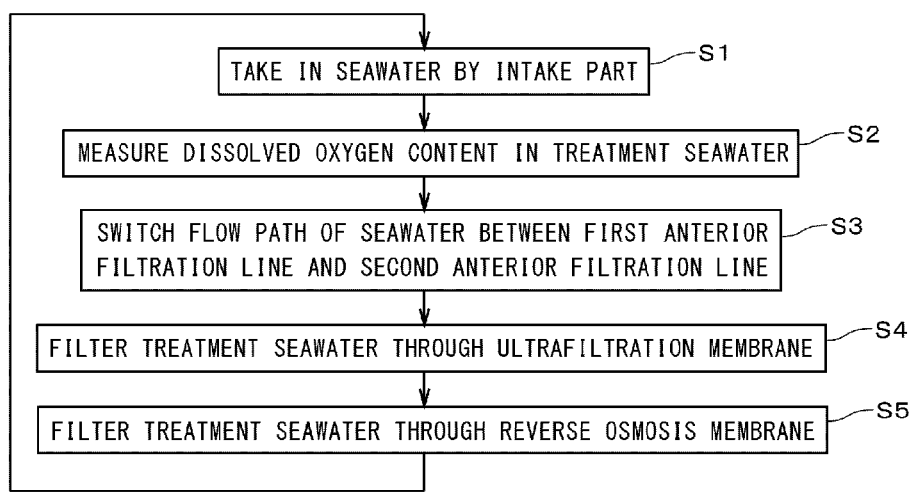

[Fig. 4]
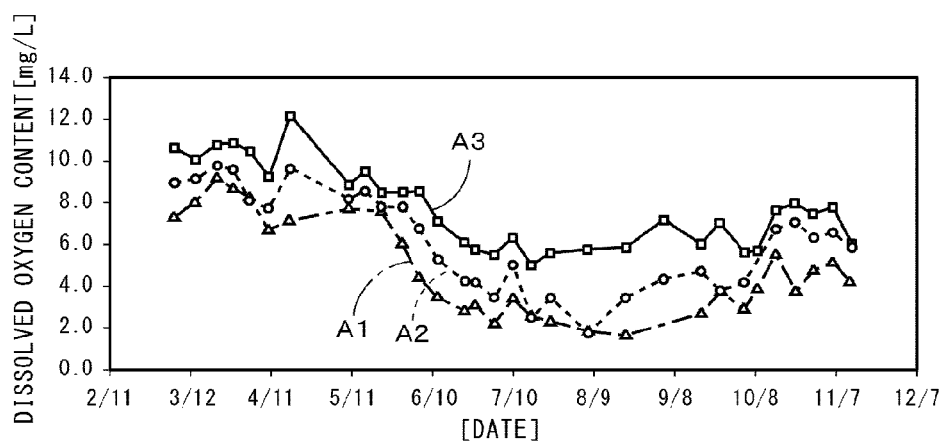

SEAWATER DESALINATION SYSTEM AND SEAWATER DESALINATION METHOD

CROSS-REFERENCE TO RELATED APPLICATIONS

The present application is a 35 U.S.C. § § 371 national phase conversion of PCT/JP2014/003944, filed Jul. 25, 2014, which claims priority to Japanese Patent Application No. 2013-172889, filed Aug. 23, 2013, the contents of both of which are incorporated herein by reference. The PCT International Application was published in the Japanese language.

TECHNICAL FIELD

The present invention relates to a seawater desalination system and a seawater desalination method.

BACKGROUND ART

Seawater has conventionally been desalinated by filtration with a reverse osmosis membrane (also referred to as an "RO membrane"). In seawater desalination, a seafloor infiltration water intake method for taking in seawater that has naturally passed through a sand filtration layer of the seafloor is also known. With the seafloor infiltration water intake method, however, an amount of seawater intake may be reduced due to clogging substances such as silt getting caught in the surface layer of the sand filtration layer. In view of this, Japanese Patent Application Laid-Open No. 2013-86058 proposes a cleaning apparatus for removing clogging substances that have accumulated or become trapped in the surface layer of the sand filtration layer.

With seawater desalination using a reverse osmosis membrane, there is the problem of biofouling in which the membrance is clogged due to the growth of microorganisms such as bacteria. In order to suppress biofouling on the reverse osmosis membrane, fine filtration is preferably performed as a pretreatment on seawater that will be conveyed to the reverse osmosis membrane. In this case, it is conceivable to perform the pretreatment by using an ultrafiltration membrane (also referred to as an "UF membrane") having a small molecular weight cut-off. However, as the molecular weight cut-off of the ultrafiltration membrane decreases, higher pressure needs to be applied to the seawater in order to ensure that a certain amount of seawater will pass through the ultrafiltration membrane, and energy consumption thus increases. In addition, the degree of separation (filtration) required for the ultrafiltration membrane differs according to the condition of seawater conveyed to the ultrafiltration membrane.

SUMMARY OF INVENTION

The present invention is intended for a seawater desalination system, and it is an object of the present invention to improve the efficiency of seawater filtration with an ultrafiltration membrane.

The seawater desalination system according to the present invention includes an intake part that is buried in a sand layer of the seafloor and takes in seawater that has passed through the sand layer, an anterior filtration part that filters seawater conveyed from the intake part, using an ultrafiltration membrane, and a posterior filtration part that filters seawater conveyed from the anterior filtration part, using a reverse osmosis membrane. The anterior filtration part includes a first anterior filtration line that includes a first ultrafiltration membrane having a molecular weight cut-off, a second anterior filtration line that is provided in parallel with the first anterior filtration line and includes a second ultrafiltration membrane having another molecular weight cut-off less than the molecular weight cut-off, and a switching part that switches a path through which seawater flows from the intake part between the first anterior filtration line and the second anterior filtration line.

According to the present invention, selective use of the ultrafiltration membranes having different molecular weight cut-offs improves the efficiency of seawater filtration with the ultrafiltration membranes.

In a preferred embodiment of the present invention, the seawater desalination system further includes a measuring part that measures dissolved oxygen content in the seawater taken in by the intake part. In this case, more preferably, the seawater desalination system further includes a control part that controls the switching part in accordance with a value of dissolved oxygen content measured by the measuring part. This allows the system to automatically select an appropriate line.

The molecular weight cut-off of the second ultrafiltration membrane is preferably less than or equal to 30000.

In one aspect of the present invention, an agent including chlorine is not injected into the path of seawater from the intake part to the posterior filtration part during steady operation that excludes an initial operation performed immediately after installation of the intake part, the anterior filtration part, and the posterior filtration part.

The present invention is also intended for a seawater desalination method for use in the seawater desalination system. The seawater desalination system using the seawater desalination method includes an intake part that is buried in a sand layer of the seafloor and takes in seawater that has passed through the sand layer, an anterior filtration part that filters seawater conveyed from the intake part, using an ultrafiltration membrane, and a posterior filtration part that filters seawater conveyed from the anterior filtration part, using a reverse osmosis membrane. The anterior filtration part includes a first anterior filtration line that includes a first ultrafiltration membrane having a molecular weight cut-off, and a second anterior filtration line that is provided in parallel with the first anterior filtration line and includes a second ultrafiltration membrane having another molecular weight cut-off less than the molecular weight cut-off. The seawater desalination method includes a) measuring dissolved oxygen content in the seawater taken in by the intake part, and b) switching a path through which seawater flows from the intake part between the first anterior filtration line and the second anterior filtration line in accordance with a value of dissolved oxygen content measured in the operation a).

These and other objects, features, aspects and advantages of the present invention will become more apparent from the following detailed description of the present invention when taken in conjunction with the accompanying drawings.

BRIEF DESCRIPTION OF DRAWINGS

FIG. 1 illustrates a configuration of a seawater desalination system.

FIG. 2 illustrates a configuration of an intake part.

FIG. 3 illustrates the procedure of operations performed by the seawater desalination system to desalinate seawater.

FIG. 4 illustrates changes in dissolved oxygen content in raw water and treatment seawater.

DESCRIPTION OF EMBODIMENTS

FIG. 1 illustrates a configuration of a seawater desalination system 1 according to an embodiment of the present invention. The seawater desalination system 1 is an apparatus for taking in seawater and extracting desalinated water. The seawater desalination system 1 includes an intake part 2 that is buried in a sand layer of the seafloor and takes in seawater that has passed through the sand layer, an anterior filtration part 3 that filters seawater conveyed from the intake part 2 (hereinafter, referred to as "treatment seawater"), using an ultrafiltration membrane, a posterior filtration part 4 that filters the treatment seawater conveyed from the anterior filtration part 3, using a reverse osmosis membrane, and a control part 10 that performs overall control of the seawater desalination system 1.

FIG. 2 illustrates a configuration of the intake part 2. The intake part 2 includes an intake pipe 21 and a reverse cleaning pipe 22. The reverse cleaning pipe 22 is provided in a sand layer 91 in the surface layer of the seafloor, and the intake pipe 21 is provided in a gravel layer 92 formed under the sand layer 91. The sand layer 91 is spread with sand (which may include anthracite or garnet) having an average particle size of approximately 0.45 millimeters (mm), and the gravel layer 92 is spread with pebbles having a particle size of 2 to 12 mm. Under the gravel layer 92 is a supporting gravel layer 93 that is spread with gravel larger than that of the gravel layer 92. A screen 211 is provided around the intake pipe 21. Seawater that has passed through the sand layer 91 and the gravel layer 92 is taken into the intake pipe 21 through the screen 211 and conveyed as treatment seawater to the anterior filtration part 3 in FIG. 1. In this way, the intake part 2 performs the seafloor infiltration water intake process of taking in seawater that has passed through the sand layer.

The reverse cleaning pipe 22 has a large number of nozzles. The seawater intake process performed by the intake part 2 may reduce an amount of seawater intake due to clogging substances such as silt getting caught in the sand layer 91 serving as a sand filtration layer. In this case, water or air is ejected upward or downward from the reverse cleaning pipe 22 so that the sand in the sand layer 91 is agitated. This causes the clogging substances to be stirred up together with the sand, and be removed by being dispersed into the sea.

The anterior filtration part 3 in FIG. 1 includes a treatment seawater tank 39. The treatment seawater taken in by the intake pipe 21 is pumped into the treatment seawater tank 39 with a pump (not shown) and stored. The anterior filtration part 3 further includes a first anterior filtration line 31 and a second anterior filtration line 32 that is provided in parallel with the first anterior filtration line 31. One end of a suction pipe 38 is connected to the treatment seawater tank 39, and the other end of the suction pipe 38 branches and is connected to the first anterior filtration line 31 and the second anterior filtration line 32.

The first anterior filtration line 31 is provided with a switching valve 311, a pump 312, an adjusting valve 313, a pressure indicator 314, a first ultrafiltration membrane 315, and a flowmeter 316 in order from the upstream side to the downstream side (i.e., from the intake part 2 side to the posterior filtration part 4 side). When the switching valve 311 is in an open state, the treatment seawater in the treatment seawater tank 39 is conveyed to the first anterior filtration line 31, and the pressure of the treatment seawater is increased with the pump 312. The first ultrafiltration membrane 315 is used in the form of a hollow fiber membrane, for example, and separates unwanted substances from the treatment seawater according to its molecular weight cut-off. The flowmeter 316 measures the flow rate of treatment seawater that has passed through the first ultrafiltration membrane 315 and outputs the measurement value to the control part 10. The control part 10 adjusts the opening of the adjusting valve 313 in accordance with the measurement value received from the flowmeter 316. The pressure indicator 314 measures the pressure of the treatment seawater in the vicinity of the upstream side of the first ultrafiltration membrane 315, and the measurement value is output to the control part 10 and monitored.

The second anterior filtration line 32, similarly to the first anterior filtration line 31, is provided with a switching valve 321, a pump 322, an adjusting valve 323, a pressure indicator 324, a second ultrafiltration membrane 325, and flowmeter 326 in order from the upstream side to the downstream side. When the switching valve 321 is in an open state, the treatment seawater in the treatment seawater tank 39 is conveyed to the second anterior filtration line 32, and the pressure of the treatment seawater is increased with the pump 322. The second ultrafiltration membrane 325 has a molecular weight cut-off less than that of the first ultrafiltration membrane 315. Thus, in the case where the second anterior filtration line 32 secures the same flow rate of seawater as the first anterior filtration line 31, the treatment seawater in the second anterior filtration line 32 is pressurized to a higher pressure than the first anterior filtration line 31. The second ultrafiltration membrane 325 separates unwanted substances corresponding to its molecular weight cut-off from the treatment seawater. The flowmeter 326 measures the flow rate of seawater that has passed through the second ultrafiltration membrane 325 and outputs the measurement value to the control part 10. The control part 10 adjusts the opening of the adjusting valve 323 in accordance with the measurement value received from the flowmeter 326. The pressure indicator 324 measures the pressure of the treatment seawater in the vicinity of the upstream side of the second ultrafiltration membrane 325, and the measurement value is output to the control part 10 and monitored.

As will be described later, the anterior filtration part 3 selectively uses the first anterior filtration line 31 and the second anterior filtration line 32. In the case of using the first anterior filtration line 31, the switching valve 311 of the first anterior filtration line 31 is opened, and the switching valve 321 of the second anterior filtration line 32 is closed. In the case of using the second anterior filtration line 32, the switching valve 321 of the second anterior filtration line 32 is opened, and the switching valve 311 of the first anterior filtration line 31 is closed. As described above, in the anterior filtration part 3, the switching valves 311 and 321 serve as a switching part 30 that switches the path through which the treatment seawater flows from the intake part 2 between the first anterior filtration line 31 and the second anterior filtration line 32.

The ends of the first anterior filtration line 31 and the second anterior filtration line 32 on the posterior filtration part 4 side are connected to one end of a single connecting pipe 37. The other end of the connecting pipe 37 is connected to a reverse osmosis membrane unit 41. The reverse osmosis membrane unit 41 is formed by, for example, winding a sheet-like mesh spacer, a reverse osmosis membrane, and a sheet-like permeated-water channel material around a permeated-water collecting pipe and accommodating these members in a filter housing. In the posterior filtration part 4, the pressure of the treatment seawater is increased with a pump (not shown), and water (desalinated water) that has passed through the reverse osmosis membrane flows into the permeated water collecting pipe. This separates the treatment seawater conveyed from the anterior filtration part 3 into desalinated water and concentrated water. In a preferable posterior filtration part 4, a plurality of filter housings, each accommodating the above-described members, are provided in multistage in the reverse osmosis membrane unit 41.

The seawater desalination system 1 further includes a first measuring part 51 and a second measuring part 52. The first measuring part 51 is provided in the suction pipe 38 and measures dissolved oxygen content in the treatment seawater taken in by the intake part 2. The second measuring part 52 is provided in the connecting pipe 37 and measures dissolved oxygen content in the treatment seawater filtered by the anterior filtration part 3. The measurement values obtained by the first measuring part 51 and the second measuring part 52 are output to the control part 10. The first measuring part 51 and the second measuring part 52 may also measure other types of values such as a silt density index (SDI) or total organic carbon (TOC), in addition to a dissolved oxygen content. Preferably, the first measuring part 51 and the second measuring part 52 constantly measure dissolved oxygen content. The seawater desalination system 1 achieves a structure (closed structure) that avoids contact of the treatment water with the outside air from the intake part 2 to the posterior filtration part 4, thus preventing microorganisms and the like in the outside air from entering the treatment seawater in the intake part 2, the anterior filtration part 3, or the posterior filtration part 4.

FIG. 3 illustrates the procedure of operations performed by the seawater desalination system 1 to desalinate seawater. FIG. 3 illustrates the procedure for steady operation of the seawater desalination system 1. In actuality, the operations of steps S1 to S5 in FIG. 3 are continuously performed in parallel. During steady operation of the seawater desalination system 1, seawater that has passed through the sand layer 91 and the gravel layer 92 is continuously taken in by the intake part 2 and stored in the treatment seawater tank 39 (step S1). The first measuring part 51 measures dissolved oxygen content in the treatment seawater conveyed from the treatment seawater tank 39 and outputs the measurement value to the control part 10 (step S2).

FIG. 4 illustrates changes in dissolved oxygen content in the treatment seawater. In FIG. 4, the dashed dotted line A1 indicates a change in dissolved oxygen content in treatment seawater when the infiltration water intake rate in the intake part 2 is 5 meters (m) per day, and the broken line A2 indicates the change in dissolved oxygen content in treatment seawater when the infiltration water intake rate is 100 m per day. The solid line A3 in FIG. 4 indicates the change in dissolved oxygen content in seawater (i.e., raw water) that is directly taken in from the sea.

As illustrated in FIG. 4, it can be seen that the treatment seawater taken in through the seafloor infiltration water intake process contains less dissolved oxygen content than that in raw water irrespective of the infiltration water intake rate. This is thought to be due to biological treatment (so-called "biological filtration membrane formation") by microorganisms that multiply in the sand layer 91. Treatment seawater that is actually taken in will not only contain less dissolved oxygen content, but also have a lower content of microorganisms such as bacteria and dissolved organic substances. The dissolved oxygen content in raw water is not always constant and varies over time according to conditions such as climate. Thus, the dissolved oxygen content in the treatment seawater taken in by the intake part 2 also varies. Although the dissolved oxygen content for the infiltration water intake rate of 100 m per day (see the broken line A2 in FIG. 4) is higher than that for the infiltration water intake rate of 5 m per day (see the dashed dotted line A1 in FIG. 4), the reduction in dissolved oxygen content even for the infiltration water intake rate of 100 m per day is sufficient when consideration is given to the separation performance of the ultrafiltration membrane, which will be described later.

Next, the path through which the treatment seawater flows is switched between the first anterior filtration line 31 and the second anterior filtration line 32 in accordance with the measured value of dissolved oxygen content under the control of the control part 10 (step S3). Note that if the current path of treatment seawater is the line that has been selected in accordance with the measured value of dissolved oxygen content, the current state is maintained.

It is assumed here that the first ultrafiltration membrane 315 of the first anterior filtration line 31 has a molecular weight cut-off of 150000, and the second ultrafiltration membrane 325 of the second anterior filtration line 32 has a molecular weight cut-off of 10000. The first ultrafiltration membrane 315 having a molecular weight cut-off of 150000 is capable of separating substances such as erythrocytes, *cryptosporidium*, fungal spores, *staphylococci, pseudomonas aeruginosa, salmonella typhi*, dysentery bacilli, bacterium *coli, vibrio cholerae*, tubercle bacilli, starch, oil emulsion, influenza viruses, noroviruses, polio viruses, hepatitis A viruses, Japanese encephalitis viruses, and fibrinogen, for example. The second ultrafiltration membrane 325 having a molecular weight cut-off of 10000 is capable of separating substances such as colloidal silica, pectin, diphtheria toxin, lysozyme, lipase, asbestos, dioxins, lactose, and dyestuff, in addition to the above-described substances that can be separated by the first ultrafiltration membrane 315. As described above, the second ultrafiltration membrane 325 having a smaller molecular weight cut-off sufficiently than the first ultrafiltration membrane 315 has a higher capability of separating microorganisms, dissolved organic substances, and so on from the treatment seawater.

On the other hand, in the second anterior filtration line 32 provided with the second ultrafiltration membrane 325 having a molecular weight cut-off less than that of the first ultrafiltration membrane 315, the treatment seawater is pressurized to a higher pressure than in the first anterior filtration line 31 in order to secure a constant flow rate in the anterior filtration part 3. The pump 322 is thus required to be high powered, and the second anterior filtration line 32 uses the pump 322 larger than the pump 312 of the first anterior filtration line 31. Accordingly, the energy consumed by the pump 322 of the second anterior filtration line 32 is greater than the energy consumed by the pump 312 of the first anterior filtration line 31.

In the operation of step S3, if the dissolved oxygen content is higher than a predetermined value, the second anterior filtration line 32 provided with the second ultrafiltration membrane 325 having a molecular weight cut-off of 10000 is used. The second ultrafiltration membrane 325 separates (removes) a greater number of microorganisms, high-molecular weight organic substances, transparent exopolymer particles (TEP), and so on from the treatment seawater (step S4). The treatment seawater filtered by the second ultrafiltration membrane 325 is conveyed to the posterior filtration part 4, and the treatment seawater is then filtered through the reverse osmosis membrane to acquire desalinated water (step S5). At this time, the growth of microorganisms on the reverse osmosis membrane is suppressed due to high-molecular weight organic substances that are likely to be trapped by microorganisms having been removed from the treatment seawater. It is thus possible to suppress biofouling on the reverse osmosis membrane.

On the other hand, if the dissolved oxygen content is less than or equal to the predetermined value, the first anterior filtration line 31 provided with the first ultrafiltration membrane 315 having a molecular weight cut-off of 150000 is used in the operation of step S3, and the treatment seawater is filtered through the first ultrafiltration membrane 315 (step S4). The filtered treatment seawater is then further filtered through the reverse osmosis membrane to acquire desalinated water (step S5). At this time, the growth of microorganisms on the reverse osmosis membrane is suppressed due to the treatment seawater containing less dissolved oxygen content. It is thus possible to suppress biofouling on the reverse osmosis membrane while reducing energy consumption in the anterior filtration part 3.

As described above, in the seawater desalination system 1, the switching part 30 is controlled in accordance with the value of dissolved oxygen content measured by the first measuring part 51 and switches the path through which seawater flows from the intake part 2 between the first anterior filtration line 31 and the second anterior filtration line 32. This appropriate selection and use (i.e., selective use) of the ultrafiltration membranes having different molecular weight cut-offs improves the efficiency of filtration of the treatment seawater through the ultrafiltration membranes. The first ultrafiltration membrane 315 having a greater molecular weight cut-off requires less frequent maintenance (cleaning) than the second ultrafiltration membrane 325. Accordingly, the seawater desalination system 1 that switches between the first anterior filtration line 31 and the second anterior filtration line 32 can reduce the frequency of maintenance of the ultrafiltration membranes as compared with the case of using only the second ultrafiltration membrane 325.

Incidentally, a first agent injecting part 61 and a second agent injecting part 62 illustrated in FIG. 1 are used in an initial operation, which is an operation performed for a certain period of time immediately after installation of the seawater desalination system 1, i.e., installation of the intake part 2, the anterior filtration part 3, and the posterior filtration part 4. Specifically, in the seawater desalination system 1, which requires considerable time from installation work to the start of system operation, there is the possibility that air or seawater, or microorganisms present on the hands of workers or the like may enter various pipes (i.e., contaminate the pipes) in the seawater desalination system 1. Thus, immediately before the start of operation of the seawater desalination system 1 or at the time of the initial operation performed immediately after the start of operation of the seawater desalination system 1, initial cleaning is performed in which the first agent injecting part 61 injects sodium hypochlorite into the suction pipe 38, for example, and the switching valves 311 and 321 switch the path of the treatment seawater conveyed from the intake part 2 at a certain time interval between the first anterior filtration line 31 and the second anterior filtration line 32 (alternatively, the treatment water may be caused to flow through both lines). This sterilizes the inside of the suction pipe 38, the first anterior filtration line 31, the second anterior filtration line 32, and the connecting pipe 37 of the anterior filtration part 3. The second agent injecting part 62 preferably injects sodium bisulfite serving as a reducing agent into the connecting pipe 37 because the reverse osmosis membrane of the reverse osmosis membrane unit 41 has low chlorine resistance.

Meanwhile, the seawater desalination system 1 can reduce dissolved oxygen content in the treatment seawater by seafloor infiltration water intake using a biological filtration membrane in the sand layer 91. Therefore, in the preferable seawater desalination system 1, agents (chemical) including chlorine are not injected into the path of treatment seawater from the intake part 2 to the posterior filtration part 4 during steady operation, which excludes the above-described initial operation. In a more preferable seawater desalination system 1, even agents that do not include chlorine are not injected into the path of treatment seawater from the intake part 2 to the posterior filtration part 4 because microorganisms and high-molecular weight organic substances in the treatment seawater can be reduced by using the ultrafiltration membrane 315 or 325 of the first anterior filtration line 31 or the second anterior filtration line 32. In this way, even if no agents are used during steady operation, the seawater desalination system 1 using the seafloor infiltration water intake process and the ultrafiltration membranes 315 and 325 is able to suppress biofouling on the reverse osmosis membrane. In addition, the running cost of the seawater desalination system 1 can be reduced.

The seawater desalination system 1 described above can be modified in various ways. While the seawater desalination system 1 in FIG. 1 automatically selects an appropriate line as a result of the switching part 30 being controlled by the control part 10, the switching between the first anterior filtration line 31 and the second anterior filtration line 32 may be manually performed by an operator operating the switching part 30. The dissolved oxygen content in the treatment seawater may also be measured by an operator.

The switching part 30 may be operated and controlled on the basis of an index (e.g., SDI) other than dissolved oxygen content in the treatment seawater. Using one of the first anterior filtration line 31 and the second anterior filtration line 32 during maintenance of the other line (e.g., cleaning of the ultrafiltration membrane 315 or 325) allows the seawater desalination system 1 to operate continuously. Whether or not to clean the ultrafiltration membranes 315 and 325 may be determined based on the measurement values of the flowmeters 316 and 326 or the like obtained when the opening of the adjusting valve 313 is at a maximum. Also, a predetermined agent (e.g., citric acid or sodium hydroxide) may be used for maintenance of the lines.

The first ultrafiltration membrane 315 may have a molecular weight cut-off other than 150000, and the second ultrafiltration membrane 325 may have a molecular weight cut-off other than 10000. Preferably, the molecular weight cut-off of the second ultrafiltration membrane 325 is one-third or less (more preferably, one-fifth or less) of that of the first ultrafiltration membrane 315. This allows the second ultrafiltration membrane 325 to have a sufficiently higher capability of separating microorganisms and high-molecular weight organic substances in the treatment seawater than the first ultrafiltration membrane 315. From the viewpoint of reducing microorganisms and high-molecular weight organic substances in the treatment seawater to a certain amount or less, the second ultrafiltration membrane 325 preferably has a molecular weight cut-off of 30000 or less. In practice, the second ultrafiltration membrane 325 has a molecular weight cut-off of 1000 or more.

Depending on the design of the seawater desalination system 1, three or more anterior filtration lines respectively including ultrafiltration membranes having different molecular weight cut-offs from one another, may be provided, and the path through which the treatment seawater flows from the intake part 2 may be switched among these posterior filtration lines.

The configurations of the above-described embodiment and variations may be appropriately combined as long as there are no mutual inconsistencies.

While the invention has been shown and described in detail, the foregoing description is in all aspects illustrative and not restrictive. It is therefore understood that numerous modifications and variations can be devised without departing from the scope of the invention.

REFERENCE SIGNS LIST

1 Seawater desalination system
2 Intake part
3 Anterior filtration part
4 Posterior filtration part
10 Control part
30 Switching part
31 First anterior filtration line
32 Second anterior filtration line
41 Reverse osmosis membrane unit
51 First measuring part
91 Sand layer
315 First ultrafiltration membrane
325 Second ultrafiltration membrane
S1 to S5 Step

The invention claimed is:

1. A seawater desalination system comprising:
an intake part that is buried in a sand layer of the seafloor and takes in seawater that has passed through the sand layer;
an anterior filtration part that filters seawater conveyed from said intake part, using an ultrafiltration membrane; and
a posterior filtration part that filters seawater conveyed from said anterior filtration part, using a reverse osmosis membrane,
said anterior filtration part including:
a first anterior filtration line that includes a first ultrafiltration membrane having a molecular weight cut-off;
a second anterior filtration line that is provided in parallel with said first anterior filtration line and includes a second ultrafiltration membrane having another molecular weight cut-off less than said molecular weight cut-off; and
a switching part that switches a path through which seawater flows from said intake part between said first anterior filtration line and said second anterior filtration line.

2. The seawater desalination system according to claim 1, further comprising:
a measuring part that measures dissolved oxygen content in the seawater taken in by said intake part.

3. The seawater desalination system according to claim 2, further comprising:
a control part that controls said switching part in accordance with a value of dissolved oxygen content measured by said measuring part.

4. The seawater desalination system according to claim 1, wherein
the molecular weight cut-off of said second ultrafiltration membrane is less than or equal to 30000.

5. The seawater desalination system according to claim 1, wherein
an agent including chlorine is not injected into the path of seawater from said intake part to said posterior filtration part during steady operation that excludes an initial operation performed immediately after installation of said intake part, said anterior filtration part, and said posterior filtration part.

6. A seawater desalination method for use in a seawater desalination system,
said seawater desalination system including:
an intake part that is buried in a sand layer of the seafloor and takes in seawater that has passed through the sand layer;
an anterior filtration part that filters seawater conveyed from said intake part, using an ultrafiltration membrane; and
a posterior filtration part that filters seawater conveyed from said anterior filtration part, using a reverse osmosis membrane,
said anterior filtration part including:
a first anterior filtration line that includes a first ultrafiltration membrane having a molecular weight cut-off; and
a second anterior filtration line that is provided in parallel with said first anterior filtration line and includes a second ultrafiltration membrane having another molecular weight cut-off less than said molecular weight cut-off,
said seawater desalination method comprising:
a) measuring dissolved oxygen content in the seawater taken in by said intake part; and
b) switching a path through which seawater flows from said intake part between said first anterior filtration line and said second anterior filtration line in accordance with a value of dissolved oxygen content measured in said operation a).

7. The seawater desalination method according to claim 6, wherein
an agent including chlorine is not injected into the path of seawater from said intake part to said posterior filtration part during steady operation that excludes an initial operation performed immediately after installation of said intake part, said anterior filtration part, and said posterior filtration part.

8. The seawater desalination system according to claim 2, wherein
the molecular weight cut-off of said second ultrafiltration membrane is less than or equal to 30000.

9. The seawater desalination system according to claim 3, wherein
the molecular weight cut-off of said second ultrafiltration membrane is less than or equal to 30000.

10. The seawater desalination system according to claim 2, wherein
an agent including chlorine is not injected into the path of seawater from said intake part to said posterior filtration part during steady operation that excludes an initial operation performed immediately after installation of said intake part, said anterior filtration part, and said posterior filtration part.

11. The seawater desalination system according to claim 3, wherein
an agent including chlorine is not injected into the path of seawater from said intake part to said posterior filtration part during steady operation that excludes an initial operation performed immediately after installation of said intake part, said anterior filtration part, and said posterior filtration part.

12. The seawater desalination system according to claim 4, wherein
an agent including chlorine is not injected into the path of seawater from said intake part to said posterior filtration part during steady operation that excludes an initial operation performed immediately after installation of said intake part, said anterior filtration part, and said posterior filtration part.

13. The seawater desalination system according to claim 8, wherein
an agent including chlorine is not injected into the path of seawater from said intake part to said posterior filtration part during steady operation that excludes an initial operation performed immediately after installation of said intake part, said anterior filtration part, and said posterior filtration part.

14. The seawater desalination system according to claim 9, wherein
an agent including chlorine is not injected into the path of seawater from said intake part to said posterior filtration part during steady operation that excludes an initial operation performed immediately after installation of said intake part, said anterior filtration part, and said posterior filtration part.

* * * * *